United States Patent [19]
Kostorz

[11] Patent Number: 5,205,483
[45] Date of Patent: Apr. 27, 1993

[54] VANDAL-PROOF THERMOSTATIC MIXING VALVE

[75] Inventor: Jan R. Kostorz, Menden, Fed. Rep. of Germany

[73] Assignee: Friedrich Grohe Aktiengesellschaft, Hemer, Fed. Rep. of Germany

[21] Appl. No.: 708,513

[22] Filed: May 31, 1991

[30] Foreign Application Priority Data

Jun. 15, 1990 [DE] Fed. Rep. of Germany ....... 4019233

[51] Int. Cl.$^5$ ............................................. G05D 23/13
[52] U.S. Cl. ..................................... 236/12.2; 236/42
[58] Field of Search ................. 236/12.16, 12.19, 12.2, 236/12.21, 12.22, 42

[56] References Cited

U.S. PATENT DOCUMENTS

| | | | |
|---|---|---|---|
| 3,765,604 | 10/1973 | Trubert et al. | 236/12.2 |
| 4,029,256 | 6/1977 | Dauga | 236/12.2 |
| 4,185,771 | 1/1980 | Killias | 236/12.2 |
| 4,232,827 | 11/1980 | Braukmann et al. | 236/42 |
| 4,558,819 | 12/1985 | McDonald | 236/42 |
| 4,607,788 | 8/1986 | Bendall | 236/12.2 |
| 4,767,052 | 8/1988 | Kostorz | 236/12.22 |
| 4,915,295 | 4/1990 | Pullen et al. | 236/12.16 |

FOREIGN PATENT DOCUMENTS 3530812 3/1987 Fed. Rep. of Germany .

*Primary Examiner*—William E. Tapolcai
*Attorney, Agent, or Firm*—Herbert Dubno; Andrew Wilford

[57] ABSTRACT

A self-regulating mixing valve has a main housing having hot- and cold-water inlets and provided with an externally threaded stem defining an axis, a valve body displaceable axially in the housing between hot and cold end positions blocking flow from the inlets and through intermediate positions permitting flow from both inlets, and a thermostat in the housing connected to the valve body. An abutment ring fixed on the housing around the stem is provided with a stop. An adjustment nut threaded on the stem adjacent the ring is axially operatively engaged with the thermostat so that rotation of the nut in one direction about the axis axially displaces the thermostat in one direction and opposite rotation axially oppositely displaces it. A protective sleeve centered on the axis and fixed on the ring extends axially outward from the ring coaxially around the sleeve and projects axially outward past the sleeve. An adjustment knob having an annular skirt engaging coaxially between the protective sleeve and the knob is provided with another stop angularly engageable with the stop of the abutment ring to limit angular displacement of the knob on the stem. Interengaging axially extending formations on and between the knob and the nut rotationally couple same together while permitting same to move axially relative to each other. A screw engaged axially between the knob and the nut and fixes the knob axially to the nut.

11 Claims, 2 Drawing Sheets

VANDAL-PROOF THERMOSTATIC MIXING VALVE

FIELD OF THE INVENTION

The present invention relates to a mixing valve. More particularly this invention concerns a thermostatic mixing valve.

BACKGROUND OF THE INVENTION

A standard thermostatic mixing valve which is provided with an internal thermostat so that when set to a desired temperature it will automatically adjust itself to maintain this temperature is described in German patent document 3,530,812. It has a housing formed with separate hot- and cold-water input connections and with a tempered-water output connection typically carrying a faucet. A valve body in the housing can move between full-cold and full-hot end positions to admit hot and cold water in different ratios, depending on the desired setting which itself is established by an adjustment knob or lever. A thermostat, which term here means a device capable of changing position or shape dependent on temperature, can act on the valve body to move it so as to keep the temperature of the water downstream of the valve body constant. Normally this thermostat is provided downstream of the dual flow-control valve in a tempered-water chamber so it can respond to the temperature of the water immediately at the valve.

In my U.S. Pat. No. 4,767,052 I describe another such a valve having a main housing having hot- and cold-water inlets, compartments, and valve seats. A valve body is displaceable axially in the housing between one end position engaging and blocking only the hot-water seat and an opposite end position engaging the blocking only the cold-water seat. On moving between these end positions the valve body passes through intermediate positions permitting flow from both inlet compartments past the respective seats into the outlet compartment. A fitting body fixed in the housing and defining a wall of the outlet compartment is formed with a throughgoing hole opening into the outlet compartment. A thermostat in the outlet compartment is fixed with the valve body to a tubular stem engaged through and limitedly axially movable in the hole of the fitting body. A seal ring engages around the stem to seal the hole and a spring is braced between the housing and the stem outside the outlet compartment to pull the thermostat and valve body into solid engagement with the fitting body. A temperature-selecting mechanism engages via the stem with the thermostat and operatively engages via the thermostat with the valve body.

Such a valve typically has in addition a stop mounted on the housing and another stop mounted on the adjustment knob to limit the angular movement of this knob. Thus the maximum and/or minimum temperature setting can be established. This feature is of particular use when the valve is to be used in a public setting to avoid wasting hot water and injuring the users.

The knob simply normally sits on large nut that can rotate on the housing and that carries a pusher that is engageable with the valve body, typically via a force limiter. Thus the knob is fairly exposed.

With this arrangement the external structure of the valve is therefore fairly easy to damage or tamper with. Repositioning the housing stop can change the maximum and/or minimum setting for the temperature, and just general rough use can break the knob which is typically anchored at a single central point to the actuating nut. The exposed parts are also subject just in the normal wear-and-tear of cleaning to substantial abuse when in a public setting so that they are frequently broken or worn out.

OBJECTS OF THE INVENTION

It is therefore an object of the present invention to provide an improved thermostatically controlled valve.

Another object is the provision of such an improved thermostatically controlled valve which overcomes the above-given disadvantages, that is which is extremely durable and, in fact, virtually vandal proof.

SUMMARY OF THE INVENTION

A self-regulating mixing valve according to this invention has a main housing having hot- and cold-water inlets and provided with an externally threaded stem defining an axis, a valve body displaceable axially in the housing between hot and cold end positions blocking flow from the inlets and through intermediate positions permitting flow from both inlets, and a thermostat in the housing connected to the valve body. An abutment ring fixed on the housing around the stem is provided with a stop. An adjustment nut threaded on the stem adjacent the ring is axially operatively engaged with the thermostat so that rotation of the nut in one direction about the axis axially displaces the thermostat in one direction and opposite rotation axially oppositely displaces it. A protective sleeve centered on the axis and fixed on the ring extends axially outward from the ring coaxially around the sleeve and projects axially outward past the sleeve. An adjustment knob having an annular skirt engaging coaxially between the protective sleeve and the knob is provided with another stop angularly engageable with the stop of the abutment ring to limit angular displacement of the knob on the stem. Interengaging axially extending formations on and between the knob and the nut rotationally couple same together while permitting same to move axially relative to each other. A screw engaged axially between the knob and the nut and fixes the knob axially to the nut.

Thus with this system the knob is extremely compactly seated on the housing in the protective sleeve and is therefore out of harm's way. The parts are therefore difficult to damage either intentionally or accidentally.

In order to lock in a temperature setting, for instance in a hospital, the skirt of the knob has centered on the axis an outwardly directed frustoconical surface and the valve is equipped with a locking ring having centered on the axis an inwardly directed frustoconical surface engaging the surface of skirt. In this case the ring is braced axially between the knob and the housing and radially between the knob and the protective sleeve. The knob is tightened down by the screw to lock in any setting.

According to another feature of this invention the knob includes an outer part exposed outside the protective sleeve and an annular inner part wholly inside the sleeve and engaged axially between the outer part and the nut. Both parts are rotationally coupled to the nut by the formations. In this case the outer part and the sleeve are both made of metal.

The abutment ring according to the invention is formed with a plurality of radially projecting pins and the sleeve is formed with respective radially inwardly open pockets receiving the pins and locking the sleeve on the ring. The stop of the ring projects axially outward and the stop of the knob projects axially inward and the stops are angularly engageable with each other. In addition the formations between the knob and the nut are axially extending and radially interengaging grooves and ridges and the housing and the ring are formed with axially extending and radially interengaging grooves and ridges. In this case the ring is provided with radially outwardly deflectable snap fingers and the housing is formed with at least one recess into which the fingers engage.

The knob can also be provided with a radially projecting handle that is removed when the locking ring is used. In all systems the skirt has an outer surface riding on an inner surface of the sleeve. This provides extra support for the knob, making it even stronger.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
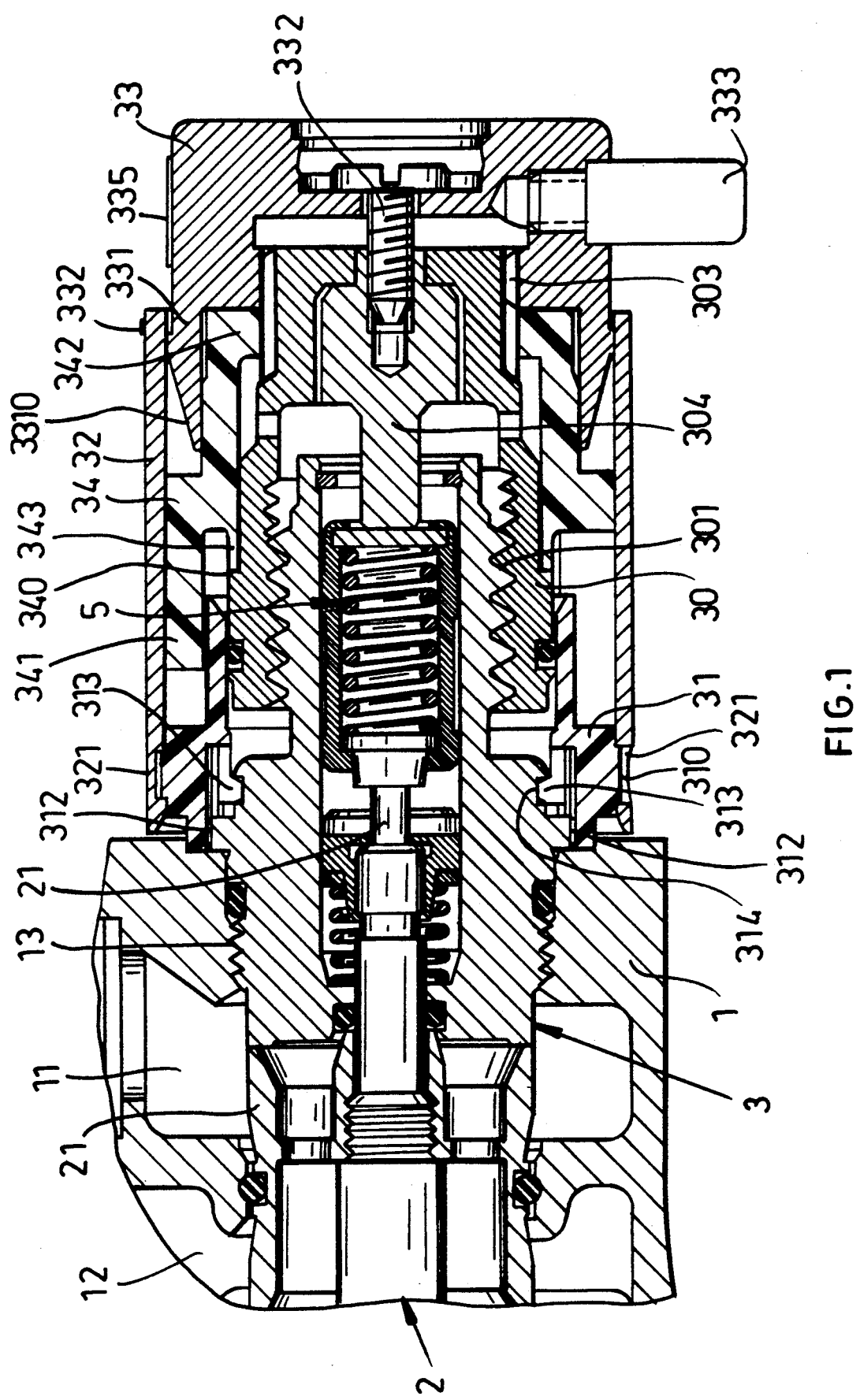
FIG. 1 is an axial section through the actuator end of the valve according to this invention.

As seen in FIG. 1 a valve housing 1 according to this invention is centered on an axis A and has radially outwardly open cold- and hot-water inlets 11 and 12. A stem-type fitting 3 also centered on the axis A is secured at a screwthread 13 to the housing 1 and a thermostat 2 inside the housing 1 has a stem 21 projecting axially out through this fitting 3 to a spring-loaded force limiter 5 held therein. This stem fitting 3 is formed with a screwthread 301 by means of which it is coupled to a nut 30 itself also centered on the axis A and formed with an axial projection 304 engageable through the force limiter 5 with the thermostat stem 21. These parts 1, 3, and 30 are all of metal, preferably a durable plated steel or brass. Rotation of the nut 30 in one direction will push the thermostat 2 axially one way and increase the output temperature of the valve and opposite rotation will oppositely adjust the temperature. This structure is largely standard and is described in more detail in above-cited U.S. Pat. No. 4,767,052.

A synthetic-resin stop ring 31 is fitted over the base of the fitting 3. Interengaging and axially extending grooves and ridges 312 on the ring 31 and on the fitting 3 couple same against relative angular movement while permitting the ring 31 to be slipped axially over the fitting 3. Fingers 313 projecting axially inward from the ring 31 can snap into a groove 314 formed in the fitting 3 to lock them axially together.

Figure 3:
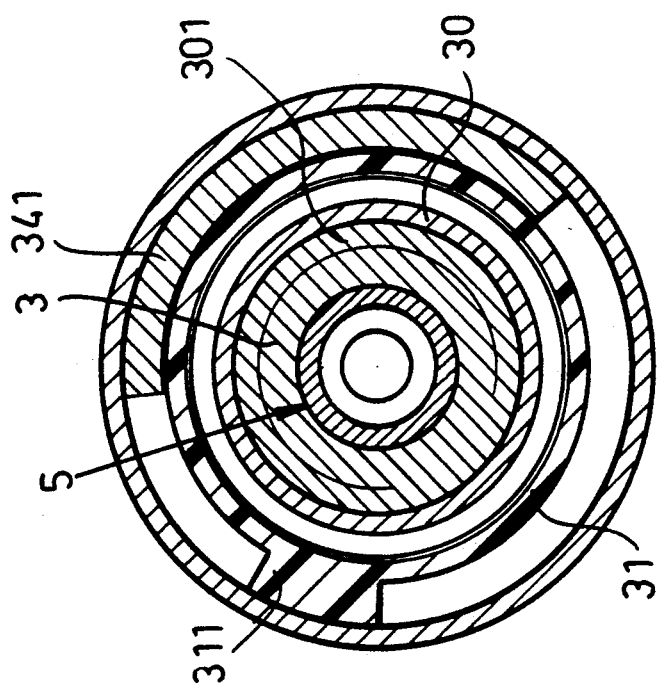
FIG. 3 is a section taken along line III—III of FIG. 2.

A cylindrical metal protective sleeve 32 has an inner end fitted snugly over the ring 31 and an outer end that projects axially well past the end of the fitting 3. This sleeve 32 is centered on the axis A. It is formed level with the ring 31 with radially inwardly open holes 31 into which fit respective pins or bumps 310 formed on the ring 31 to lock the two parts together. The sleeve 32 is further formed with an axially and radially outwardly projecting stop 311 shown in FIG. 3 which, as will be described below, defines end positions for the valve.

A knob has an outer part 33 made of metal and an inner part 34 made of a synthetic resin both secured by interfitting axially extending splines 303 to the nut 30 so that this knob 33, 34 can move axially but not rotationally on the nut 30. The part 34 has an axially inwardly and radially outwardly extending projection 341 that can angularly engage the stop 311 to define the above-mentioned angular end positions of the knob 33, 34. This part 34 has an axially inwardly projecting annular skirt or flange 343 that engages an axially outwardly directed shoulder 340 of the nut 30 and has at opposite end 342 forming an axially outwardly directed abutment. The outer knob part 33 is centered on the axis and basically cup-shaped. It has a skirt 331 with a frustoconical outer surface 3310 that is engaged radially between the outer end 342 of the inner part 34 and the outer end of the sleeve 32, providing a very solid centering of this part 33. More particularly, this skirt 331 rides on its cylindrical outer surface on the cylindrical inner surface of the sleeve 32 to support the knob 33, 34. A screw 332 is engaged on the axis A through the outer part 33 and into the nut 30 to secure these two elements together, thereby pressing the outer part 33 against the outer abutment end 342 of the inner part 34 and pressing its skirt 343 against the shoulder 340 of the nut 30. The knob part 33 carries indicia 335 alignable with a pointer 332 on the sleeve 32 to show the user the set temperature.

For normal domestic use as shown in FIG. 1 a radially projecting rod or lever 333 is screwed into the outer part 33. This allows the device to be adjusted normally within the limits defined by the two stops 311 and 341.

Figure 2:
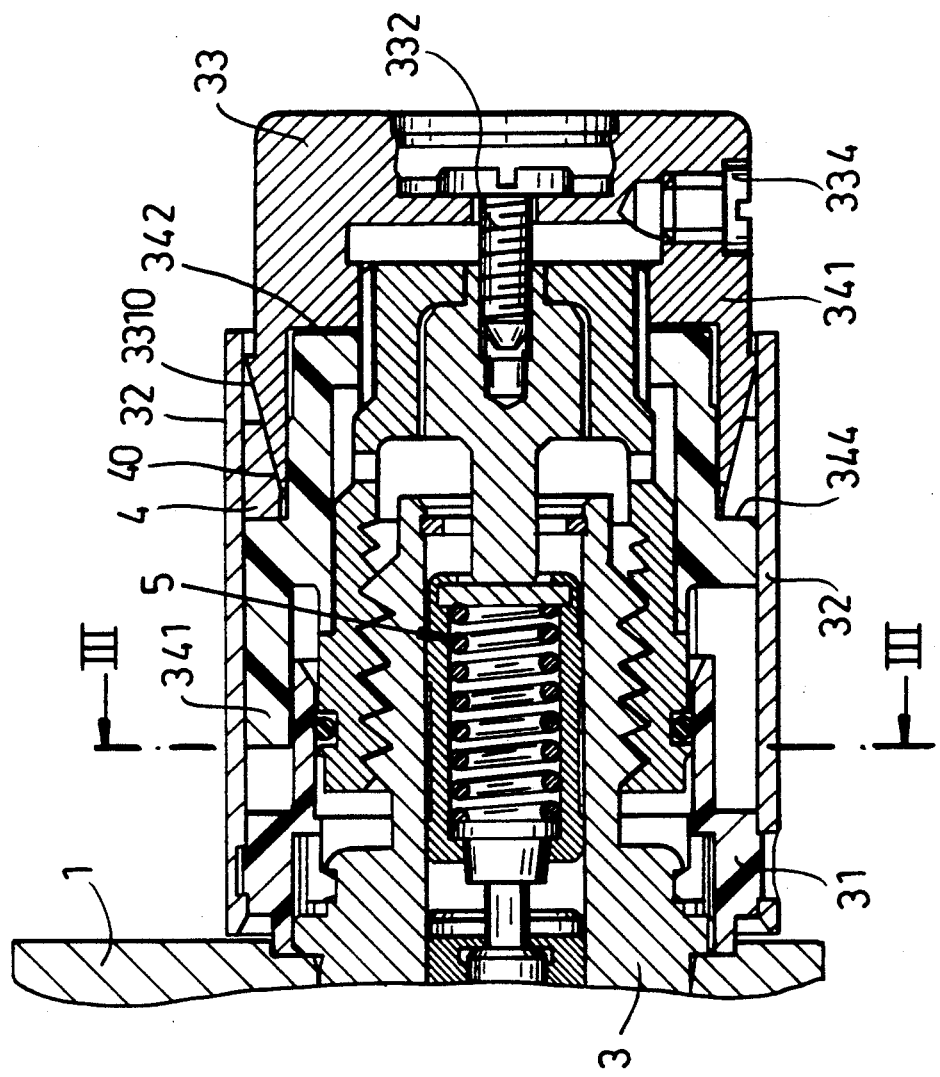
FIG. 2 is a view like FIG. 1 but showing the valve locked in one position.

When used in, for instance, a mental hospital or the like a ring 4 as shown in FIG. 2 is interposed between a shoulder 344 of the part 34 and the inner end of the outer part 33. This ring 4, which is split for ease of mounting, has a frustoconical inner surface 40 complementary to the surface 3310. It is of such radial and axial dimensions that when the screw 332 is pulled down tight it compresses this ring 4 axially between the element 33 and the element 34 and radially between the element 33 and the stationary sleeve 32. The result is an effective angular locking of the position of the knob 33, 34. In this arrangement the lever 333 is replaced with a plug 334. Only a person willing to remove the unillustrated cap over the screw 332 and apply a tool to it can change the set temperature.

The valve according to this invention presents nothing more than smooth metallic surfaces to the exterior. Obtaining access to the interior of the valve requires tools so the casual user cannot possibly the end temperature positions or even change the temperature.

I claim:

1. A self-regulating mixing valve comprising:
   a main housing having hot- and cold-water inlets and provided with an externally threaded stem defining an axis;
   a valve body displaceable axially in the housing between hot and cold end positions blocking flow from the inlets and through intermediate positions permitting flow from both inlets;
   a thermostat in the housing connected to the valve body;
   an abutment ring fixed on the housing around the stem and provided with a stop;
   an adjustment nut threaded on the stem adjacent the ring and axially operatively engaged with the thermostat, whereby rotation of the nut in one direction about the axis axially displaces the thermostat in one direction and opposite rotation axially oppositely displaces it;

a protective sleeve centered on the axis, fixed on the ring, extending axially outward from the ring coaxially around the sleeve, and projecting axially outward past the sleeve;

an adjustment knob having an annular skirt engaging coaxially between the protective sleeve and the knob, the knob being provided with another stop angularly engageable with the stop of the abutment ring to limit angular displacement of the knob on the stem;

interengaging axially extending formations on and between the knob and the nut rotationally coupling same together while permitting same to move axially relative to each other; and a screw engaged axially between the knob and the nut and fixing the knob axially to the nut.

2. The thermostatic valve defined in claim 1 wherein the skirt of the knob has centered on the axis an outwardly directed frustoconical surface, the valve further comprising a locking ring having centered on the axis an inwardly directed frustoconical surface engaging the surface of skirt, the ring being braced axially between the knob and the housing and radially between the knob and the protective sleeve.

3. The thermostatic valve defined in claim 1 wherein the knob includes an outer part exposed outside the protective sleeve and an annular inner part wholly inside the sleeve and engaged axially between the outer part and the nut, both parts being rotationally coupled by the formations to the nut.

4. The thermostatic valve defined in claim 3 wherein the outer part and the sleeve are of metal.

5. The thermostatic valve defined in claim 1 wherein the abutment ring is formed with a plurality of radially projecting pins and the sleeve is formed with respective radially inwardly open pockets receiving the pins and locking the sleeve on the ring.

6. The thermostatic valve defined in claim 1 wherein the stop of the ring projects axially outward and the stop of the knob projects axially inward and the stops are angularly engageable with each other.

7. The thermostatic valve defined in claim 1 wherein the formations between the knob and the nut are axially extending and radially interengaging grooves and ridges.

8. The thermostatic valve defined in claim 1 wherein the housing and the ring are formed with axially extending and radially interengaging grooves and ridges.

9. The thermostatic valve defined in claim 8 wherein the ring is provided with radially outwardly deflectable snap fingers and the housing is formed with at least one recess into which the fingers engage.

10. The thermostatic valve defined in claim 1, further comprising a radially projecting handle fixed on the knob.

11. The thermostatic valve defined in claim 1 wherein the skirt has an outer surface riding on an inner surface of the sleeve.

* * * * *